E. H. NEWCOMB.
Fruit-Gatherer.
No. 55,150. Patented May 29, 1866.
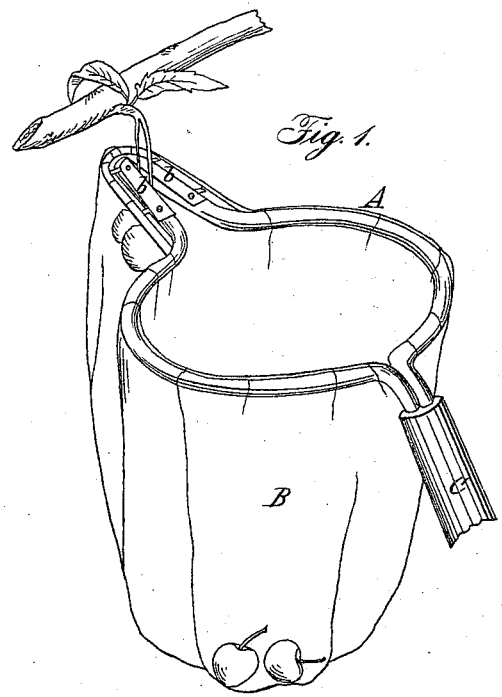
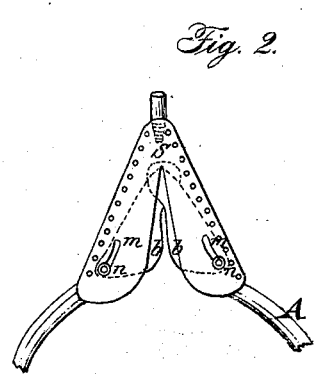
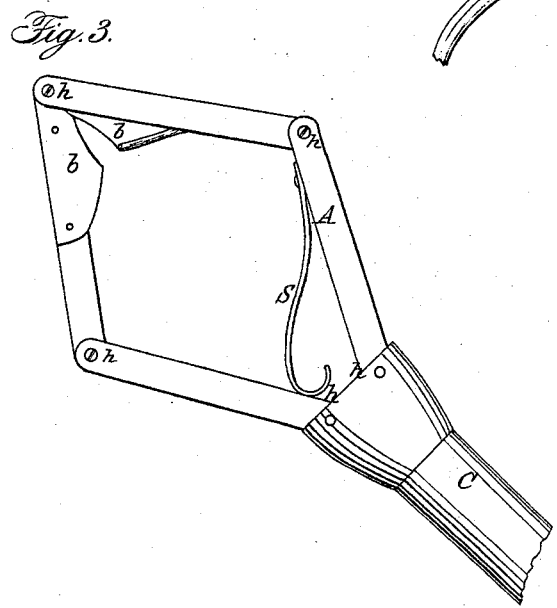
Witnesses:
Alex. A. C. Klauck
W. F. Hall
Inventor:
E. H. Newcomb

UNITED STATES PATENT OFFICE.

ELIZA H. NEWCOMB, OF NEW YORK, N. Y.

IMPROVEMENT IN FRUIT-GATHERERS.

Specification forming part of Letters Patent No. 55,150, dated May 29, 1866.

*To all whom it may concern:*

Be it known that I, ELIZA H. NEWCOMB, of the city, county, and State of New York, have invented a new and useful Improvement in Fruit-Gatherers; and I do hereby declare the following to be a full, clear, and exact description of the same, reference being had to the accompanying drawings, forming part of this specification, in which—

Figure 1 represents a perspective view of the fruit-gatherer. Fig. 2 is a plan view of the same when the blades are made to act as shears. Fig. 3 is also a plan view of the same when the blades have the shear action.

Similar letters of reference indicate like parts.

The nature of my invention consists in applying converging blades to the part of the ring or frame opposite the handle, so that the stem of the fruit is readily cut by the simple motion of withdrawing the fruit-gatherer, the fruit falling into the bag attached to the ring; and it further consists in an arrangement of parts by means of which the converging blades are made to have the action of shears in cutting the stem of the fruit by the simple motion of withdrawing the fruit-gatherer.

In the drawings, Figure 1, A represents the ring or frame to which the bag B is attached for the reception of the fruit. C is the handle, and b b the converging blades for severing the stem. In this figure the blades b b are represented as stationary.

In Fig. 2, A is the ring or frame to which the bag is attached. b b are the converging blades, made to operate as shears in cutting the stem (by the resistance of the latter in the withdrawal of the fruit-gatherer) by means of a spring, s, applied to the blades, in connection with the pins n n, working in the curved slots m m.

In Fig. 3, A is the frame to which the bag is attached. This frame is made in several pieces, hinged together at h h h h, the action of which, in connection with the spring s and converging blades b b, cuts the stem, as in the form represented in Fig. 2, by the resistance of the stem in the withdrawal of the fruit-gatherer.

The advantages of my fruit-gatherer are obvious.

The stem of the fruit to be gathered is made to enter the narrow space between the converging blades, situated opposite the handle, by the simple withdrawal of the fruit-gatherer. All danger of injury to the fruit in gathering it is obviated, as the space between the blades is too narrow to admit the fruit between the blades. The cutting power is derived from the resistance of the stem and increases with the resistance, and the simple withdrawal of the fruit-gatherer effects the desired result without the employment of strings or similar devices to operate the blades.

Having thus described my invention, what I claim as new, and desire to secure by Letters Patent, is—

1. The employment, in a fruit-gatherer, of converging blades b b, applied to the frame or ring A, and operated by the simple withdrawal of the fruit-gatherer, substantially as described.

2. The combination of the ring A, converging blades b b, curved slots m m, pins n n, and spring s, by means of which a shear action of the converging blades is obtained by the simple withdrawal of the fruit-gatherer, substantially as described.

3. The combination of the hinged frame A, either square or circular, with four joints or more, converging blades b b, and spring s, by means of which a shear action of the converging blades is obtained by the simple withdrawal of the fruit-gatherer, substantially as described.

The above specification of my improvements in fruit-gatherers signed this 11th day of May, 1866.

E. H. NEWCOMB.

Witnesses:
ALEXR. A. C. KLAUCKE,
W. F. HALL.